Feb. 21, 1956  F. S. COYLE  2,735,437
DENTAL FLOSS APPLICATOR
Filed Sept. 30, 1953

INVENTOR.
FRANCIS S. COYLE
BY WHITEHEAD & VOGL
PER Carl Whitehead
ATTORNEYS

United States Patent Office 2,735,437
Patented Feb. 21, 1956

2,735,437

DENTAL FLOSS APPLICATOR

Francis S. Coyle, Boulder, Colo.

Application September 30, 1953, Serial No. 383,203

4 Claims. (Cl. 132—92)

This invention relates to devices, articles, and apparatus for dental care and cleaning of the teeth and more particularly to a new and improved article for holding dental floss and the like; and has as a primary object the provision of a new and improved device for holding a reach of dental floss between a pair of extended fingers to permit the same to be used for cleaning the teeth and to be easily accessible to all spaces and surfaces of the teeth in an easy, simple manner.

Other objects of this invention are to provide such an improved device for holding a reach of dental floss between extending fingers which (a) holds slick nylon floss tightly without slipping while in use; (b) permits the dental floss to be quickly changed during an operation; (c) is adapted to carry within itself a conventional cartridge containing a spool of floss; (d) functionally combines a floss-containing cartridge within itself to simplify the structure providing the floss-feeding operation to the extended fingers of the article; (e) includes a simplified improvement in the construction of such a conventional cartridge to facilitate holding and gripping of the floss; (f) permits an utmost economy in the use of dental floss; and, (g) is a neat, simple, inexpensive and durable article.

With the foregoing and other objects in view, all of which shall more fully hereinafter appear, my invention comprises certain novel constructions, arrangements, and combinations of parts and elements as hereinafter described, and as defined in the appended claims, and illustrated, in preferred embodiment, in the accompanying drawing, in which:

Figure 1:
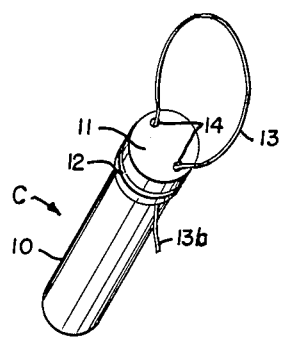
Figure 1 is an isometric view of a conventional floss-containing cartridge with a reach of dental floss extending through the apertures in the lid thereof in accordance with the invention.

The use of dental floss has become increasingly popular since new and improved forms of thread such as nylon and similar plastics have been introduced. Such floss fibres may be formed as flat-surfaced threads which will not easily break or become frayed when used in cleaning the spaces between teeth. However, several difficulties exist in their use. When used in an ordinary manner, as by stretching a reach of floss between the fingers of an individual, the floss is so slippery that it is virtually impossible to hold it, and the pushing of such floss between teeth, at the back of a person's mouth, is quite difficult because of the space limitations within a person's mouth. Therefore, the present invention was conceived and developed and comprises, in essence, an improved article of manufacture for carrying and holding without slipping a reach of dental floss between a pair of extended fingers and for combining within this article a conventional floss containing cartridge.

Referring in detail to the drawing, a conventional floss containing cartridge is formed as a relatively long cylindrical ampoule 10 closed at one end by a cup-like lid 11. The lid 11 and ampoule 10 include threads 12 so that the lid may be turned onto the top of the cylinder. An elongated spool 13a of dental floss 13 is carried within this ampoule 10 and in conventional construction there is provided a pair of diametrically spaced apertures 14 at the top of the lid through which the strand of floss may be extended so that it may be stripped from the spool 13a within the cartridge without opening the lid.

The lid 11 is loosely fitted onto this ampoule 10 so that a strand of dental floss will pass easily between the lid flange and ampoule side wall and past the thread 12 contours and this conventional loosely made construction is taken advantage of in the use of my improved floss holding device.

The ampoule is modified for use in my invention by providing an orifice 15 through a side wall of the ampoule at a point near the rim of the lid flange and the strand of floss 13 is threaded from the spool 13a through this orifice 15 thence upwardly along the side wall of the ampoule under the flange of the lid and through an aperture 14 at the top of the lid 11; thence, the floss is looped around the extended fingers of my device, as hereinafter described, and then threaded through the other aperture 14 and downwardly along the side wall of the ampoule underneath the lid flange to terminate beyond the lower rim of the lid flange as at 13b clearly shown at Figs. 1 through 5. It follows that by loosening the lid of the cartridge a small amount, the looped strand of floss may be pulled through the aperture and past the lid in any manner desired. Then by tightening the lid onto the ampoule the top of the lid contacts the edge 16 of the ampoule opening to tightly hold the floss strand in position.

Figure 2:
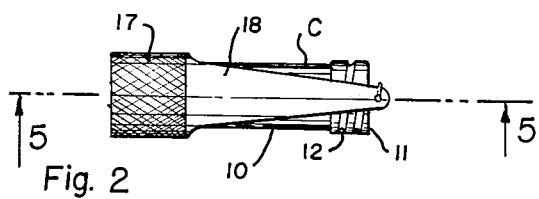
Figure 2 is a plan view of my improved article with a cartridge therein as in a retracted position.
Figure 3:
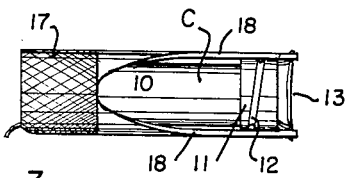
Figure 3 is a side elevation view of the unit shown at Fig. 2.
Figure 5:
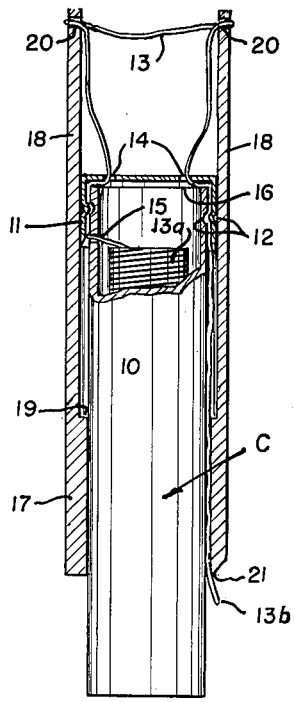
Figure 5 is a longitudinal section as illustrated from the indicated line 5—5 at Fig. 2, but on an enlarged scale and with the finger positions partially extended.

My improved floss holding device is formed as a cylindrical unit including a body portion 17 at one end thereof, which is adapted to fit over the ampoule 10 with a snug sliding fit so that the ampoule will not slip when moved to any selected position, such as the retracted position as shown at Figs. 2 and 3, or the extended position as shown at Fig. 5. The outer surface of this body may be knurled as shown or finished in any other suitable manner to enhance gripping of the device.

Figure 4:
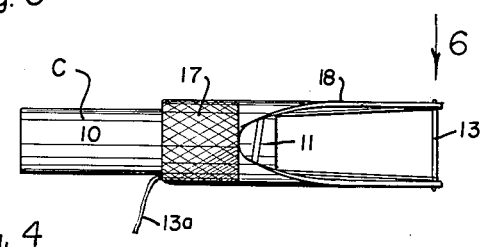
Figure 4 is similar to Fig. 3, but showing the article extended as for use.
Figure 6:
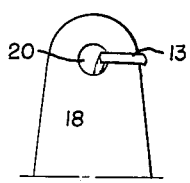
Figure 6 is an enlarged fragmentary portion of a finger tip of the improved article as viewed from the indicated arrow 6 at Fig. 4 and with a strand of floss threaded therethrough.

A pair of diametrically opposed fingers 18 which are a continuation of the cylindrical elements of the body extend from one end of this body 17 and are suitably tapered from a wide portion at the body to a narrow portion at their ends to provide stability when they are extended for use as shown at Fig. 4. The bore between the cylindrical segments forming these fingers is slightly larger in diameter than the bore within the body portion 17 with an internal step 19 between the internal passage of the body and fingers so that the ampoule 10 moves within the bore of the body 17 and the lid 11 of slightly larger diameter than the ampoule moves in the bore between the fingers to be stopped against the step 19 at the extended position shown at Fig. 4. If, however, the construction of the cartridge is such that the opening of the ampoule is of smaller diameter than the wall and the diameter of the lid is the same as the diameter of the ampoule the bore through the fingers and body will be of the same diameter and the step 19 will not exist.

The end of each finger includes an orifice 20 through which the loop of the dental floss is threaded as clearly shown at Figs. 2 through 6 with the reach spanning the ends of the fingers being adapted for use in cleaning teeth. In the operation of this unit, the steps are, to pull a loop of floss from the cartridge then tighten the lid of the cartridge so as to securely hold the floss in position, thence extend the cartridge from the body of the device oppositely to the fingers so that the loop is tightly held in position as shown at Fig. 4. By adjustably tightening the lid of the cartridge a condition may be obtained where the floss will slip through the lid with considerable resistance yet the floss strand may be pulled from and through the top of the lid by extending the fingers and holding the end 13b of the floss strand against the wall of the ampoule during the extending operation. In this manner a fresh reach of floss may be pulled across the fingers by a comparatively simple operation.

A sharpened edge 21 may be provided at the end of the body to cut off excess floss as clearly shown at Fig. 5.

While I have illustrated and described many details and constructions, it is apparent that alternative and equivalent constructions and arrangements will occur to those skilled in the art, hence, it is my desire that my protection be limited, not to the details illustrated and described but only by the proper scope of the appended claims.

I claim:

1. A floss holder for a floss-containing cartridge formed as an end-threaded, cylindrical ampoule having a loosely-fitted flanged lid with mating screw threads adapted to permit the lid to be turned and tightened upon the ampoule, an orifice through the ampoule wall near the edge of the flange and a pair of diametrically opposed orifices through the top of the lid, including, in combination, a cylindrical body adapted to slidingly fit over the cartridge, a pair of diametrically opposed fingers formed as extensions of the cylindrical elements of said body portion and adapted to slidingly extend beyond said lid and thread-retaining means at the ends of said fingers, whereby a tensioned loop of floss may be formed by threading the floss through said wall orifice, thence between the ampoule side wall and lid flange, thence out of a lid orifice, thence about said thread-retaining means, thence into the other lid orifice, and thence between the ampoule side wall and lid flange to extend outside the ampoule beyond the lid flange and with the lid flange subsequently tightened, and the fingers extended beyond the ampoule.

2. The organization defined in claim 1 wherein said floss strand extending beyond the edge of the lid flange extends through the holder body portion and a cutting edge at the base of the body adjacent the floss after its passage through the lid by which the floss may be severed.

3. The combination with a cartridge adapted to contain a spool of dental floss and permit a loop of floss to be extended therefrom and comprising a cylindrical ampoule having a loosely fitted flanged lid with mating screw threads adapted to permit the lid to be turned and tightened upon the ampoule, an orifice through the ampoule wall near the edge of the lid flange and a pair of diametrically opposed orifices through the top of the lid; of a floss holder including a body portion adapted to slidingly embrace said ampoule, and a pair of fingers extending from the body portion at each side of and beyond said lid and adapted to engage said loop at their extended ends and thereby hold a reach of floss between the extended ends of the fingers when said loop is passed through said wall orifice, thence between the ampoule side wall and lid flange, over the edge of the ampoule opening, thence out of the lid orifice, thence into the other lid orifice and thereby forming said loop, thence, over the ampoule opening edge, and thence between the ampoule side wall and lid flange to extend beyond the edge of the lid flange whereby to permit adjustments of the size of the loop and to hold the loop by tightening the lid.

4. A floss holder for a floss-containing cartridge formed as a cylindrical ampoule having a loosely-fitted flanged lid with mating screw threads adapted to permit the lid to be turned and tightened upon the ampoule and passage means through the lid and between the lid and ampoule adapted to permit a loop of floss to be extended from the ampoule and secured by tightening of the lid upon the ampoule, comprising, in combination, a body portion adapted to slidingly embrace said ampoule and a pair of fingers extending from the body portion at each side of and beyond said lid and adapted to engage said loop at their extended ends and thereby hold a reach of floss between the extended ends which may be tightened by slidable extension of the body and fingers along the ampoule to tension the loop.

References Cited in the file of this patent

UNITED STATES PATENTS

| | | |
|---|---|---|
| 1,239,633 | Stickler | Sept. 11, 1917 |
| 1,780,045 | Schubert | Oct. 28, 1930 |
| 2,460,591 | Luzar | Feb. 1, 1949 |
| 2,467,221 | Pastl | Apr. 12, 1949 |
| 2,516,539 | Atols | July 25, 1950 |
| 2,644,469 | Cohen | July 7, 1953 |